June 14, 1927.
J. J. GEORGI
1,632,285
GAS GENERATOR
Filed Dec. 6, 1923
2 Sheets-Sheet 1
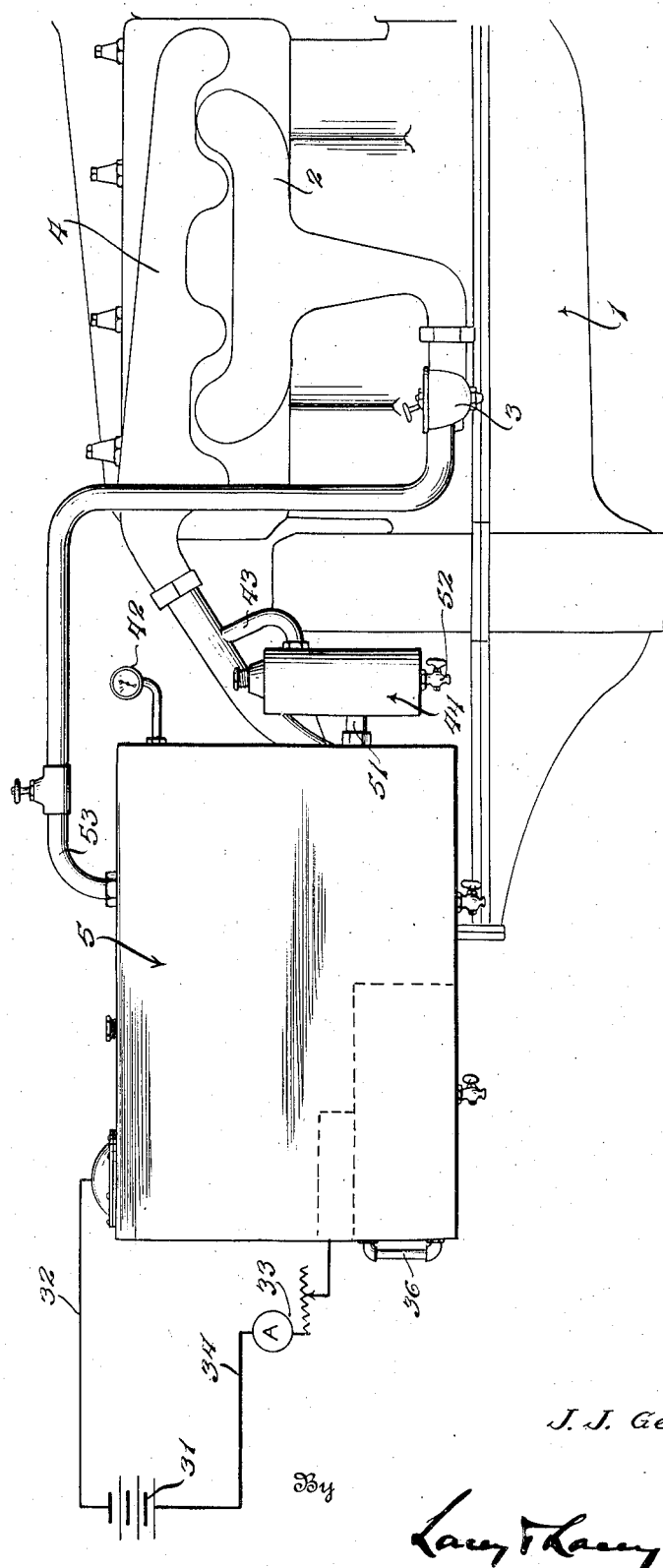
Inventor
J. J. Georgi
By
Lacy & Lacy, Attorneys

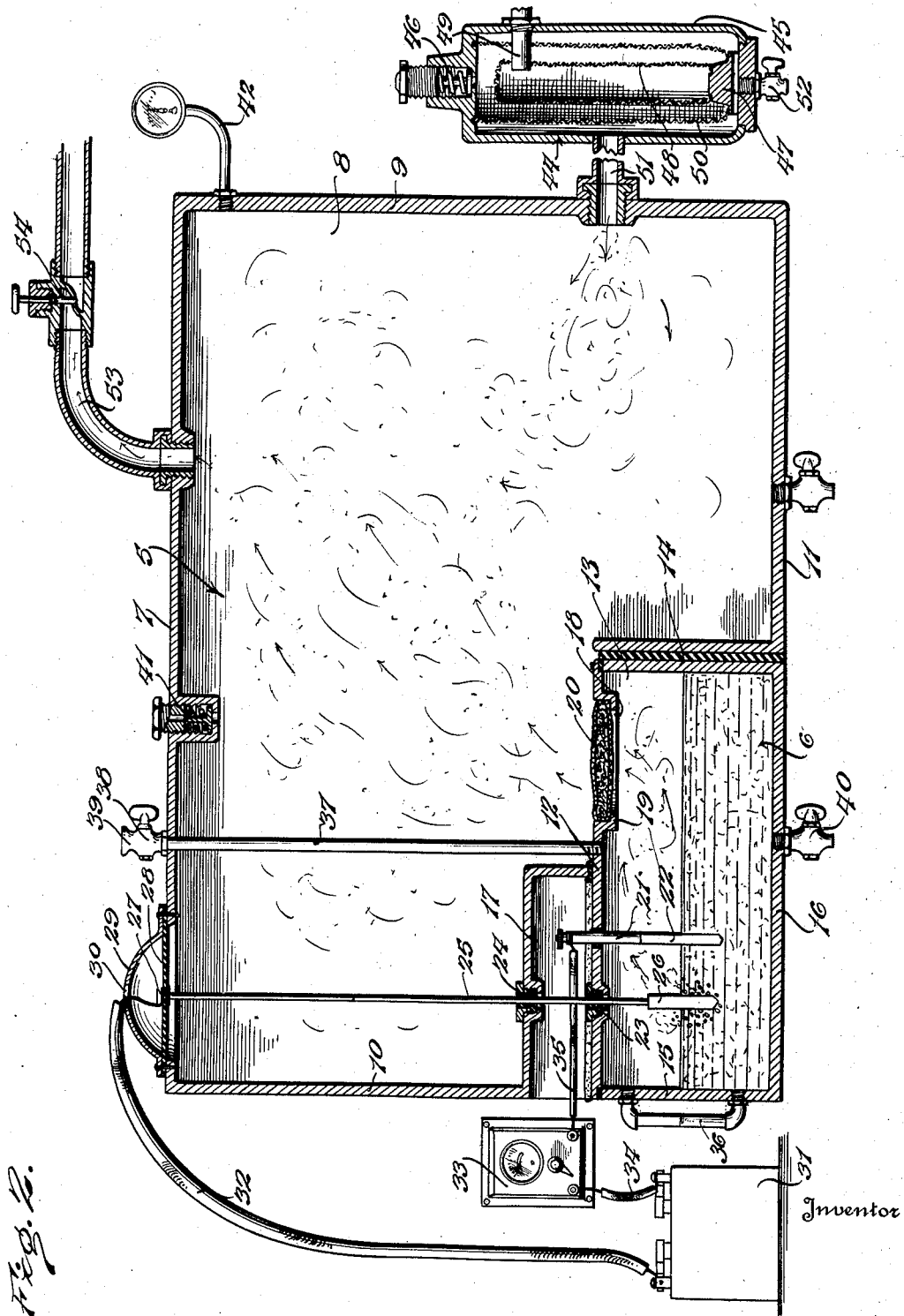

Patented June 14, 1927.

1,632,285

UNITED STATES PATENT OFFICE.

JOHN J. GEORGI, OF WEST ORANGE, NEW JERSEY.

GAS GENERATOR.

Application filed December 6, 1923. Serial No. 678,926.

This invention relates to an apparatus for generating a combustible gas and supplying the same under pressure to the carbureter of an internal combustion engine, the primary object of the invention being to provide means whereby the ordinary gaseous mixture may be considerably improved in its explosive qualities to thereby increase the efficiency of the engine to which it is supplied.

Another object of the invention is to provide novel means for generating a combustible gas in properly regulated quantities and utilize a portion of the exhaust from the engine as a medium for supplying the generated gas, under pressure, to the carbureter and intake manifold of the engine.

Another object of the invention is to provide means whereby all impurities will be removed from the auxiliary gas supply so that none will reach the carbureter.

In the accompanying drawings:

Figure 1 is a side elevation of the apparatus embodying the invention installed in connection with an internal combustion engine;

Figure 2 is a vertical sectional view through the apparatus.

In Figure 1 of the drawings there is indicated, in a more or less diagrammatic manner, an internal combustion engine which is indicated in general by the numeral 1, the engine including the usual intake manifold 2, carbureter 3, and exhaust manifold 4. The apparatus embodying the invention is designed to generate an explosive gaseous mixture which will be supplied to the carbureter and constitute a substitute for the air which is ordinarily drawn into the carbureter by suction created in the operation of the engine. The apparatus comprises a gas receiving chamber, indicated by the numeral 5, which chamber may be of any desired contour and construction but preferably at one end and at its lower side is recessed to accommodate a gas generating chamber which is indicated in general by the numeral 6. The chamber 5 includes a top wall 7, side walls 8, an end wall 9, and a second end wall 10, as well as a bottom indicated by the numeral 11, the bottom and end wall 10 being suitably formed to accommodate the generating chamber 6. The generating chamber 6 comprises a top 12, side walls 13, end walls 14 and 15, and a bottom 16, and the two chambers are suitably united and the chamber 5 is provided inwardly of its end wall 10 with an integral housing 17 which overlies a portion of the top 12 of the chamber 6. The remaining portion of the top 12 of the generating chamber 6 lies within the chamber 5 and is provided with an opening 18 defined by a supporting flange 19 upon which is disposed and suitably held a filtering medium 20 which may be of any desired construction and of any desired material. For example, the filtering medium may be made up of a suitable foraminous casing filled with charcoal, or other carbonaceous material which, while permitting the escape of gases generated in the chamber 6, to the gas collecting chamber 5, will prevent the passage of any moisture or other deleterious matter from the generating chamber into the said gas collecting chamber 5.

Mounted in the portion of the top 12 of the generating chamber 6 which is beneath the hood 17, is the stem 21 of an electrode 22. The said portion of the top 12 and the top of the hood 17 are provided with insulated stuffing boxes 23 and 24 which are in vertical alinement and through which is slidably fitted a rod 25 which constitutes the stem of an electrode 26, the electrodes 22 and 26 being located within the generating chamber 6 in suitably spaced relation. The stem comprising the rod 25 is extended upwardly within the receiving chamber 5 and is suitably connected, as at 27, to a diaphragm 28 which diaphragm is preferably of rubber and circular in form and confined at its margin between the top wall 7 of the chamber 5 and the margin of a casing 29 which is secured upon the said wall 7 and which is provided with a vent opening 30. Inasmuch as the stem 25 of the electrode 26 is slidably mounted through the stuffing boxes 23 and 24, any excess pressure of gas within the chamber 5 will force the diaphragm 28 upwardly thereby elevating the electrode 26 and partially or wholly withdrawing it from the fluid which is contained within the generating chamber 6. The numeral 31 indicates a source of current supply which may be either a battery or a generator, and a wire 32 leads from one terminal of the battery through the vent opening 30 in the housing 29 and is electrically connected with the upper end of the rod 25 comprising the stem of the electrode 26. The numeral 33 indicates a rheostat and ammeter combined and a wire 34 leads from the upper terminal of the battery to one terminal of the rheostat, and a wire 35 leads from the other terminal of the rheostat and is electrically connected with the stem 21 of the electrode 22. It will be evident at this point that as the pressure increases in the receiving chamber 5 and is exerted against the diaphragm 28, the diaphragm will be bulged upwardly thereby, elevating the electrode 26 and reducing the volume of gas generated. A gage 36 of any approved type is mounted upon one end of the generating chamber 6 and is employed to indicate the level of the fluid within the said chamber. A supply pipe 37 is mounted vertically within the receiving chamber 5 and opens at its lower end through the top of the generating chamber 6 and at its upper end extends through the top 7 of the said chamber 5 and is provided with a cut off valve 38 the casing of which may have a flared mouth 39 into which the fluid to be introduced into the chamber 6 to replenish the same may be poured, the valve 38 being closed after the fluid level within the chamber 6 has reached the proper elevation with relation to the electrode. A drain valve 40 is mounted in the bottom 16 of the generating chamber 6.

In the operation of the apparatus, water will be introduced into the generating chamber 6 and to the water will be added, prior to its introduction, some suitable catalyzing agent. When the electrical circuit is closed, the water will be decomposed and the constituent gases which are thus generated, will pass through the filter 20 and into the receiving chamber 5.

A safety valve of any approved type, indicated by the numeral 41, is mounted in the top 7 of the casing 5 so as to relieve any excess pressure, and a pressure gage 42 is preferably mounted upon the tank 5 at any convenient point.

From the exhaust pipe which leads from the exhaust manifold 4, there is led a branch pipe 43 which enters a flame arrester indicated in general by the numeral 44, and which comprises a casing 45 in the upper end of which is arranged a safety valve 46. A boss 47 is provided within the casing 45 at the bottom thereof, and a cage 48 of wire gauze is mounted upon the boss and upstands within the casing. The pipe 43, where it enters through the wall of the casing, is provided with a nozzle 49 which enters one side of the cage 48 at the upper end thereof, and a second cage 50 is preferably arranged within the casing 45 and at its lower end surrounds the boss 47 and at its upper end is united to the upper end of the said casing, the cage 50 enclosing the said cage 48. A pipe 51 leads from the opposite side of the casing 45 and into the end wall 9 of the gas receiving chamber 5. A drain valve 52 is mounted in the bottom of the casing 45 of the flame arrester so as to permit of draining of any oil or other condensed vapors from the said casing.

The numeral 53 indicates a pipe which leads from the top 7 of the receiving chamber 5 to the carbureter 3 of the engine, and a needle valve 54 is interposed in this pipe so as to control the flow of gases from the chamber 5 to the carbureter.

In the operation of the apparatus, the electrical circuit is closed through the electrodes so as to effect electrolytic decomposition of the solution in the generating chamber 6, and the gases generated pass through the filter 20 and into the receiving chamber 5. At the same time a portion of the exhaust from the engine is directed through the flame arrester 44, the screens of which prevent the passage of flame to the interior of the receiving chamber 5, and the clarified exhaust vapors are discharged into the said chamber 5 where they mingle with the generated gases. The charge thus formed is conducted through the pipe 53 and past the valve 54 to the carbureter 3 where the required proportion of vaporized fuel is taken up, and the final mixture is then delivered to the intake manifold in the usual manner and distributed to the cylinder of the engine. It should be stated that the carbureter 3 draws in air along with the mixture from the pipe 53. The mixture and air then pass through the carbureter and take up a proportionate amount of fuel in the form of vapor in a manner well understood, the resultant mixture being homogeneous and highly explosive and leaving little, if any, carbon to foul the engine. In the event the pressure within the receiving chamber 5 becomes excessive, the electrode 26 will be elevated in the manner heretofore explained, so that generation of gas within the chamber 6 will be arrested or diminished and until normal conditions have been reached whereupon the electrode will be again lowered into the solution within the said chamber 6.

Having thus described the invention, what is claimed as new is:

1. The combination with an internal combustion engine, the carbureter associated therewith, and the exhaust from the engine, of a receiving chamber, means for electrolytically decomposing water and delivering the evolved gases to the said chamber, means for conducting a portion of the gas from the exhaust under pressure into the chamber, and means for conducting the mixture of gases from the chamber to the carbureter.

2. The combination with an internal combustion engine, the carbureter associated therewith, and the exhaust leading therefrom, of a receiving chamber, means for electrolytically decomposing water to produce an enriching gas mixture, means for delivering the gas mixture to the said receiving chamber, means for conducting a portion of the gases from the exhaust into the said chamber to establish pressure therein, and means for conducting the gaseous mixture under pressure from the chamber to the carbureter.

3. In apparatus of the class described, the combination with an internal combustion engine, the carbureter associated therewith, and the exhaust leading therefrom, of a generating chamber, electrodes mounted therein and having means for the connection of leads from a source of current supply, a receiving chamber in communication with the generating chamber to receive the gases generated in the generating chamber, means establishing communication between the exhaust and the receiving chamber, and means for conducting the gases from the receiving chamber to the carbureter.

4. In apparatus of the class described, the combination with an internal combustion engine, the carbureter associated therewith, and an exhaust leading from the engine, of means for generating an enriching gas, a receiving chamber in communication with the generating means and arranged to receive the generated gases, means establishing communication between the exhaust and the said receiving chamber, and means establishing communication between the receiving chamber and the carbureter.

5. In apparatus of the class described, a generating chamber, a receiving chamber in communication with the generating chamber and arranged to receive gases generated therein, electrodes mounted in the generating chambers, one of said electrodes being vertically movable whereby to be adapted to be immersed to a greater or less depth in the liquid within the generating chamber to be decomposed electrolytically, the electrodes having means for the connection of leads from a source of current supply, a diaphragm to be acted upon by pressure within the receiving chamber, and a stem extending upwardly from the movable electrode and connected with the diaphragm whereby variations in pressure in the receiving chamber will result in automatic adjustment of the electrode.

6. The combination with an internal combustion engine and carbureter associated therewith, of a generating chamber, a receiving chamber in communication with the generating chamber to receive gases generated in the said generating chamber, means establishing communication between the generating chamber and the carbureter, a flame arresting means in communication with the generating chamber, and means establishing communication between the exhaust and the said flame arresting means.

In testimony whereof I affix my signature.

JOHN J. GEORGI. [L. S.]